Oct. 1, 1968

J. T. MATSUOKA ETAL 3,403,894

ROTOR AND MIXER

Filed Aug. 3, 1967

INVENTORS
JAMES T. MATSUOKA
JEROME P. KOZIATEK

ATTORNEYS

Oct. 1, 1968    J. T. MATSUOKA ETAL    3,403,894
ROTOR AND MIXER
Filed Aug. 3, 1967    3 Sheets-Sheet 3

INVENTORS
JAMES T. MATSUOKA
JEROME P. KOZIATEK
ATTORNEYS

United States Patent Office 3,403,894
Patented Oct. 1, 1968

3,403,894
ROTOR AND MIXER
James T. Matsuoka, Brecksville, and Jerome P. Koziatek, Hinckley, Ohio, assignors, by mesne assignments, to Stewart Bolling & Co., Inc., Cleveland, Ohio, a corporation of Ohio
Filed Aug. 3, 1967, Ser. No. 658,122
11 Claims. (Cl. 259—104)

ABSTRACT OF THE DISCLOSURE

A mixer and rotors each rotor having a central body and four helical blades arranged in two pairs at opposite ends of a bladed portion. One pair of blades is longer than the other and the pairs of blades overlap centrally of the rotor. The central body tapers inwardly from opposite ends of the bladed portion to progressively diminish the cross sectional area. The blade curvatures are constant.

This invention relates to a mixing machine and a rotor therefor and more particularly to an improved plural-bladed rotor for use in mixing machines of the type used in the processing of rubber and plastics.

Mixing machines suitable for mixing rubber, plastic or other similar materials are typically provided with two mixing rotors driven in counter-rotation within a mixing chamber. Typically, such rotors have plural blades or wings that extend in a helical path along the rotor axis. The blades are constructed and arranged to move the material being mixed continuously back and forth axially of the rotors and to transfer the material from one rotor to the other during rotation.

While the use of rotors having varying numbers of blades or wings has been proposed in the past, the typical mixers in commercial use utilize two-bladed rotors. However, additional mixing can be obtained per rotor revolution with a greater number of blades of proper construction.

It is a principal object of the present invention to provide a new and improved rotor, and more particularly a four-bladed rotor, for use in mixers of the type described above, that will efficiently mix material rapidly and effectively.

It is a more specific object of this invention to provide a rotor for use in a mixer of the type herein described wherein the rotor has a central elongated body and four helical blades extending from the central body defining a bladed portion of the rotor, and wherein the central body is tapered along a bladed portion to diminish the cross sectional area of the rotor from an end of the bladed portion axially inward toward a central region. In the preferred construction the body portion is circular in cross section, and tapered conically to diminish the cross sectional area inwardly from both opposite ends.

It is another object of this invention to provide a rotor of the type referred to above in which two of the blades are longer than the other two, are arranged as a pair, and extend from one end to beyond the mid-point of the bladed portion of the rotor; and the other two blades are shorter, are arranged as a pair at the opposite end of the bladed portion, terminate short of the mid-point and extend axially beyond the termini of the longer blades.

It is another object of this invention to provide a four-bladed rotor of the type referred to above wherein the leading surface of each blade is convex and the trailing edge is concave. More particularly, it is an object to provide such a rotor in which the curvatures of the leading and trailing edges in transverse cross section are arcuate and the radius of the trailing edge is greater in length than that of the leading edge. In the preferred construction the radius of the leading edge is substantially equal to the mean diameter of the central body of the bladed portion and the radius of the trailing edge is twice that of the leading edge.

It is a further object of this invention to provide a four-bladed rotor for use in a mixer of the type herein described in which two pairs of helical blades are provided, each pair at opposite ends of a bladed portion of the rotor, and wherein the leading and trailing surfaces of the blades have constant curvatures along the axial length of the rotor.

These and other objects, features and advantages of this invention will become more apparent as the invention becomes better understood by references to the following detailed description, when considered in conjunction with the accompanying drawings, in which.

Figure 1:
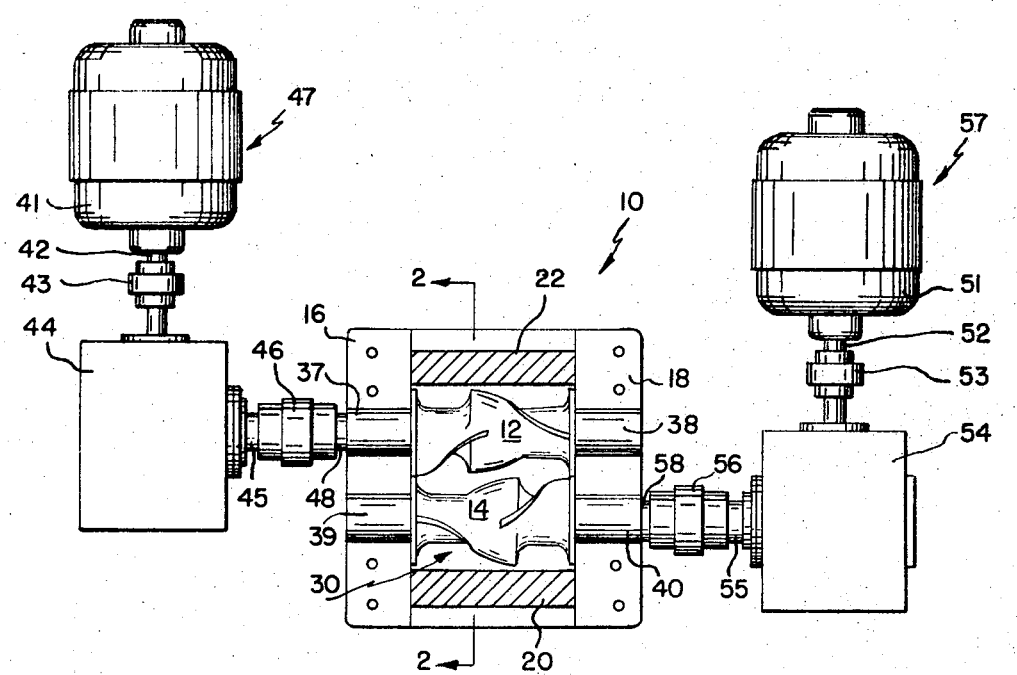
FIGURE 1 is a top plan view with parts removed and parts in section showing a mixer with two four-bladed rotors and which mixer embodies the present invention.
Figure 2:
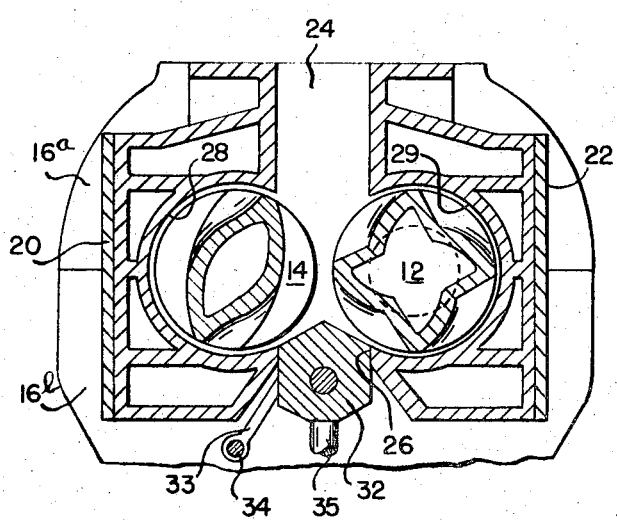
FIGURE 2 is a transverse sectional view taken along the line 2—2 in FIGURE 1 and looking in the direction of the arrows.
Figure 3:
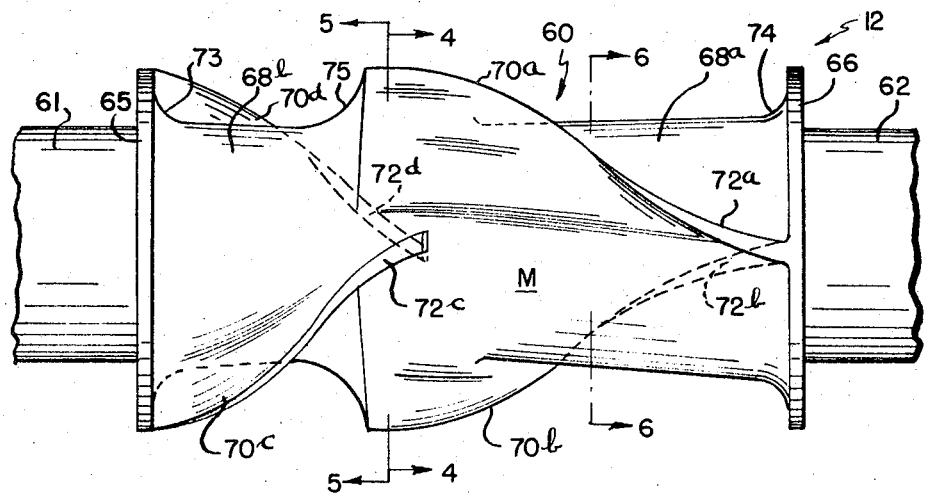
FIGURE 3 is a top plan view on an enlarged scale of a rotor as shown in FIGURE 1.
Figure 4:
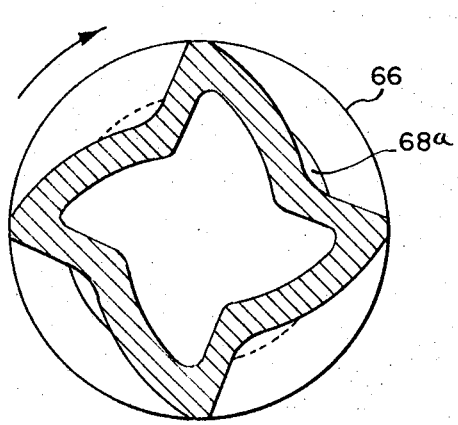
FIGURE 4 is a transverse sectional view of the rotor of FIGURE 3, taken along the line 4—4 and looking in the direction of the arrows.
Figure 5:
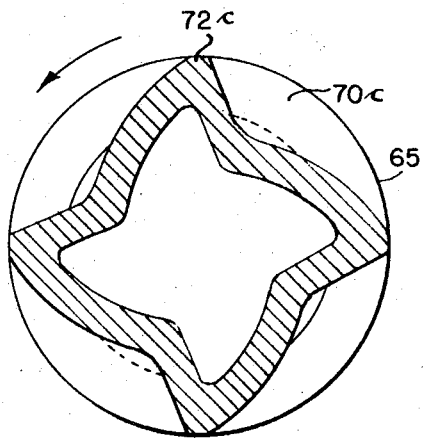
FIGURE 5 is a transverse sectional view of the rotor shown in FIGURE 3, taken along the line 5—5 and looking in the direction of the arrows.
Figure 6:
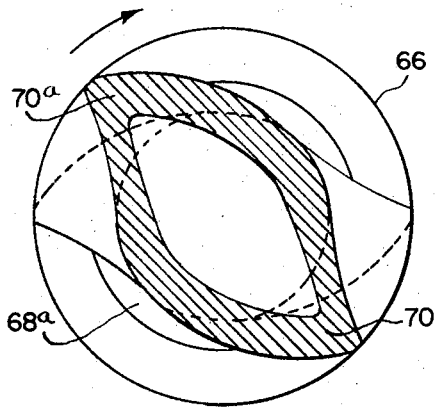
FIGURE 6 is a transverse sectional view of FIGURE 3, taken along the line 6—6 and looking in the direction of the arrows.

Referring now to the drawings, the general arrangement of a mixer for rubber or plastic materials is shown in FIGURES 1 and 2, and is indicated generally by reference numeral 10. An upper portion of the mixer 10 has been omitted to show the location of two rotors 12, 14. The mixer 10 shown, aside from the rotors 12, 14 is generally similar to the mixer shown in U.S. Patent No. 2,820,618 issued to Stewart Bolling and is not herein shown and described in detail, but as generally shown includes two end frames 16, 18. The end frame 16 is shown in FIGURE 2, having an upper portion 16a and a lower portion 16b. Mixer sides 20, 22 are located between the end frames 16, 18, on opposite sides of the two rotors 12, 14. The sides provide a top opening 24, a lower discharge opening 26 and have inside wall surfaces 28, 29 that are generally cylindrical, extend horizontally, together defining a mixing chamber 30, and receive the rotors 12, 14. A discharge door 32 closes the discharge opening 26. The door 32 is pivoted on an arm 33 about a pivot shaft 34, and is supported and moved by an actuator, partially shown at 35. As best shown in FIGURE 1, opposite ends of the two rotors 12, 14 are supported by the end frames 16, 18 and are mounted for rotation in bearings (not shown) in journal boxes 37, 38, 39 and 40 formed in the end frames.

In the particular embodiment shown, the rotors 12, 14 are driven from opposite ends of the mixer by separate rotor drives 47, 57. Alternatively, they can be driven from a common side by a single drive unit. The rotor drive 47 includes an electric motor 41 with a shaft 42 connected by a coupling 43 to a gear drive unit 44. An output shaft 45 from the gear drive unit 44 is connected by a coupling 46 to an end 48 of the rotor 12, which extends beyond the end frame 16. Similarly, the rotor drive 57 includes an electric motor 51 having a shaft 52 connected by a coupling 53 to a gear drive unit 54. An output shaft 55 of the gear drive unit 54 is connected by a coupling 56 to an end 58 of the rotor 14, which extends through the end frame 18. The rotor drives 47, 57 rotate the two rotors 12, 14 in opposite directions, as indicated by the arrows in FIGURE 2.

The general construction of the rotors is best understood with reference to rotor 12 shown in FIGURES 3 to 6 of the drawings. The rotor 12 includes a bladed portion 60 that accomplishes the mixing, and cylindrical supporting shaft sections 61, 62 at opposite ends of the bladed portion that support the rotor for rotation. The shaft sections are mounted in the journal boxes of the end frames. End portions (not shown) of the shaft sections accommodate retainers and a drive coupling. Where the two rotors 12, 14 are to be driven from opposite ends of the mixer, the two rotors may be of identical construction. When the two rotors are to be driven by a single drive unit from a common end of the mixer, there must be a reversal of the shaft sections so that the blades can be oppositely disposed as in FIGURE 1 with the coupled shaft sections extending in the same direction.

The bladed portion 60 is located between two spaced, circular, end flanges 65, 66, and includes a central body 68 and four helical blades 70a, b, c, d. Each rotor is an integral piece, normally cast of suitable material, such as steel, and is typically hollow with relatively thick walls. The blades 70a, 70b are identical in shape and extend as a pair from the central body 68 diametrically opposed to each other at one end of the bladed portion 60. They are longer than the blades 70c, 70d and extend axially from the flange 66 beyond the midpoint M of the bladed portion 60. Each blade 70a, 70b extends circumferentially about the central body 68 an angular distance of 90°. The portion of the central body along which the longer blades extend is designated 68a.

The two blades 70c, 70d are identical in shape and extend as a pair from the central body 68 diametrically opposite each other at an opposite end of the bladed portion 60 from the blades 70a, 70b. They are shorter than the blades 70a, 70b and extend axially from the flanges 65 toward the midpoint M, terminating short of the midpoint but extending axially beyond the termini of the longer blades 70a, 70b. The shorter blades 70c, 70d each extend through an angular distance of 90° about a portion 68b of the central body 68. In addition, each blade 70c, 70d is displaced 90° from the next adjacent blade 70a, 70b where the ends of the blades overlap axially.

All of the blades 70 have a flat helical outer edge 72a, b, c, d, respectively, and these outer edges lie in a common imaginary cylindrical surface extending between and defined by the peripheries of the end flanges 65, 66. The helical blades 70 are all pitched so that they will move material from the flanges 65, 66 centrally toward the zone where the blades overlap when the rotor is rotated in the direction of the arrow indicated in FIGURES 4 and 5. The manner in which the long blades 70a, 70b are located opposite the short blades of a companion rotor 14 in a mixer is indicated in FIGURE 1.

The central body 68, while losing its separate identity at the zone where the inner ends of the blades overlap axially, nevertheless has a definite contour independent of the blades along a substantial length of the bladed portion 60. As will be clear from FIGURES 3 to 6, the central body portions 68a, b are circular in transverse cross section and taper from the flanges 65, 66 inwardly to progressively reduce the cross sectional area of the bladed portion 60, to the area or zone of blade overlap. The zone of overlap, where all four blades exist, has the largest cross sectional area and this creates a zone in the mixer where the material is subjected to maximum shear. Except for fillets such as those shown at 73, 74 and 75 where the central body 68 joins flanges 65, 66 and the inner termini of the blades 70, the tapered portions 68a, b are conical, that is, formed of straight line elements that converge in a direction inwardly from the end flanges.

Figure 7:
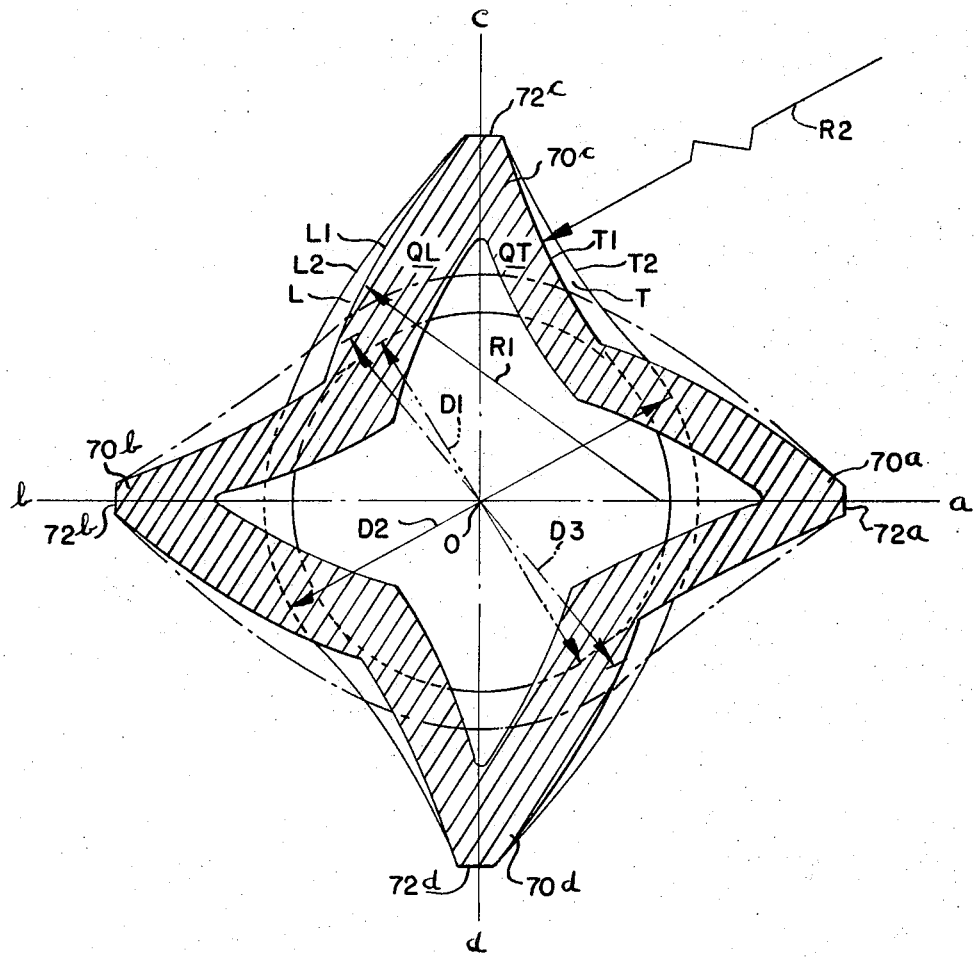
FIGURE 7 is an enlarged diagrammatical sectional view similar to FIGURE 5, indicating certain relationships in the construction and arrangement of the rotor.

The curvatures and relative sizes and relationships of the blades 70 and body 68 are best illustrated in FIGURE 7 of the drawings. FIGURE 7 is a view similar to FIGURE 5, that is, taken at the plane 5—5 of FIGURE 3, looking in the direction of the arrows, but is diagrammatic in that the extent of the blades 70c, 70d has been shown without illustrating the helical displacement of the blades about the circumference of the central body 68. Thus, the contour of the blade 70 at the plane 5—5 is superimposed in cross section upon the contour of the blade 70c at the end flange 65. This illustrates the change in cross sectional area of the central body 68 and blades 70c, 70d along the axial extent of the blades. Similarly, the blades 70a, 70b behind the plane of view 5—5 have been shown in phantom as they appear at the end flange 66, superimposed with the cross sectional area of the blades at the plane 5—5.

The leading surface of the blade 70c from the plane of cross section to the end flange 65 is represented by the area or surface L between the surface element L1 at the plane of cross section and the surface element L2 at the outer end of the blade adjacent the end flange. Both elements L1, L2 extend from the edge 72c of the blade and merge essentially tangentially with the central body 68. The diameter of the central body 68 at the plane of cross section of FIGURE 7 is indicated by D1, essentially the minimum diameter. The diameter of the central body 68 at the outer end of the bladed portion is indicated by the diameter D2 and is the maximum diameter of the body portion 68b. As will be apparent from a comparison of the body portion shown in phantom representing the central body portion 68a, the maximum diameter of the central body portion 68a is greater than that of the body portion 68b. This is because the slope or rate of area change of the tapered portions 68a, 68b axially of the rotor is the same, but the portion 68a is longer. The mean diameter of the entire body portion 68 is indicated at D3.

The radius of curvature of the leading surface L is indicated by the radius line R1 shown associated with element L1. Elements L1 and L2 as well as the leading edge curvature in any parallel plane therebetween have the same radius of curvature R1. The point at which the curvature originates, of course, varies along the length of the blade because the base width of the blade varies with the changing body diameter.

The trailing edge surface of the blade 70c is indicated at T. The curvature of this surface is illustrated by the surface element T1 in the plane of cross section of FIGURE 7 and the surface element T2 at the outer end of the blade surface. Both elements T1, T2 extend from the edge 72c of the blade and merge essentially tangentially with the central body 68. The curvature of the trailing surface T is constant throughout the length of the blade 70c and the radius of curvature is indicated at R2. As with the leading surface radius R1, the trailing surface radius R2 is of constant length for all edge elements in surface T in transverse planes parallel with elements T1, T2 and the point of origin of the radius R2 for each element varies.

Although the specific radii of the leading and trailing edges of the longer blades 72a, 72b, have not been specifically shown, the leading edge surface of each of the longer blades is of the same curvature, i.e., has the same radius R1, as the leading edge of the shorter blades 72c, 72d, and the trailing edge surface has the same radius R2 as the trailing edge curvature of the shorter blades.

As clearly indicated from the drawings, the leading edge L is convex while the trailing edge T is concave. Also, the radius of curvature of the leading edge is shorter than the radius of curvature of the trailing edge. In the preferred embodiment, the leading edge radius R1 is substantially equal to the mean diameter D3 of the central body 68.

The radius R2 of the trailing edge is twice the length of the radius R1.

The rotor in FIGURE 7 is divided into quadrants by the imaginary lines a–b and c–d bisecting the blade edges 72a, b, c, d and passing through the center O of the rotor. These lines divide each rotor blade into a leading quadrant QL and a trailing quadrant QT, designated with respect to blade 70c and defined with respect to blade 70c by the lines b o c and a o c respectively. The area QL is substantially larger than the area QT throughout the axial length of the rotor, being at least 10 percent greater and in the preferred embodiment shown being 25 percent greater.

By way of example only and not by way of limitation, a rotor embodying the present invention can have the following general dimensions:

| | |
|---|---|
| Length of bladed portion _____inches__ | 38 |
| Major outside diameter of bladed portion __do____ | 21 |
| Mean body diameter _____do____ | 12.5 |
| Radius of leading surface of blades_____do____ | 12.5 |
| Radius of trailing surface of blades _____do____ | 25 |
| Leading quadrant area _____square inches__ | 51 |
| Trailing quadrant area _____do____ | 40 |
| Taper of body sections _____percent slope__ | 10 |
| Length of shorter blades _____inches___ | 17 |
| Length of longer blades _____do___ | 26 |
| Width of blade edges _____do____ | 1 |

From the above detailed description, it will be apparent that the rotor of the present invention provides a progressive decrease in cross sectional area from the outer ends of a bladed portion inwardly to a zone where the blades overlap each other in an axial direction. At the same time, the rotor blades themselves are formed of leading and trailing surfaces having constant curvatures along the entire axial length of the blades. With this arrangement, the material being mixed has an increasing area available to it within the mixer from the outer end flanges 65, 66 of the rotors inwardly, until it reaches the generally central zone of the mixer where the pair of long blades and pair of short blades of each rotor overlap. As production requirements have increased, material processors have demanded that their mixers be operated at ever increasing speeds and pressures. With increased mixer speeds and pressures, rotors that had been previously used cause a disproportionally larger share of the mixing action to occur at the ends of the rotors. The tapered rotor body tends to provide a more desirable distribution of material and improved mixing action within the mixing chamber with the ultimate benefit of more uniformly dispersed product and homogeneous batches. Not only, then, do the four vanes on each rotor increase the mixing for each revolution of the rotors as compared with a double bladed rotor, but also the blades efficiently move the material to obtain optimum shearing throughout the chamber while yet having blade surfaces of constant curvature.

While a preferred embodiment of this invention has been described in detail, it will be understood that various modifications and alterations may be made therein without departing from the spirit and scope of the invention, as set forth in the appended claims.

We claim:

1. In a rotor for use in a mixer, such as a rubber mixer or the like, a bladed portion having a central axially elongated body, two long helical blades arranged as a pair diametrically opposite each other on the body and extending from one end thereof toward the other end, terminating beyond the midpoint of the body short of the said other end, two short helical blades arranged as a pair diametrically opposite each other on the body and extending from the said other end of the body toward the said one end, terminating short of the said midpoint and axially beyond the termini of the long blades, and the said body of the bladed portion being at least in part tapered so as to diminish in cross sectional area from the said one end of the body toward the said midpoint.

2. In a rotor for use in a mixer, such as a rubber mixer or the like, a bladed portion having a central axially elongated body, two long helical blades arranged as a pair diametrically opposite each other on the body and extending from one end thereof toward the other end, terminating beyond the midpoint of the body and short of the said other end, two short helical blades arranged as a pair diametrically opposite each other on the body and extending from the said other end of the body toward the said one end, terminating short of the said midpoint, and the said body of the bladed portion being essentially circular in transverse cross section an tapering so as to diminish in cross sectional area in an axially inward direction from each end.

3. In a rotor for use in a mixer, such as a rubber mixer or the like, a bladed portion having a central axially elongated body, two long helical blades arranged as a pair diametrically opposite each other on the body and extending from one end thereof toward the other end, terminating beyond the midpoint of the body and short of the said other end, two short helical blades arranged as a pair diametrically opposite each other on the body and extending from the said other end of the body toward the said one end, terminating short of the said midpoint and axially beyond the termini of the long blades, and the said body of the bladed portion being essentially circular in transverse cross section and tapering conically so as to diminish linearly in cross sectional area in an axially inward direction from each end of the bladed portion of the rotor.

4. In a rotor for use in a mixer, such as a rubber mixer or the like, a bladed portion having a central axially elongated body, two long helical blades arranged as a pair diametrically opposite each other on the body and extending from one end thereof toward the other end, terminating beyond the midpoint of the body and short of the said other end, two short helical blades arranged as a pair diametrically opposite each other on the body and extending from the said other end of the bladed portion of the rotor toward the said one end, terminating short of the said midpoint and axially beyond the termini of the long blades, and the individual blades each being formed with a leading surface and a trailing surface relative to the intended direction of rotation, the leading surface being convex and the trailing surface being concave.

5. In a rotor for use in a mixer, such as a rubber mixer or the like, a bladed portion having a central axially elongated body, two long helical blades arranged as a pair diametrically opposite each other on the body and extending from one end thereof toward the other end, terminating beyond the midpoint of the body and short of the said other end, two short helical blades arranged as a pair diametrically opposite each other on the body and extending from the said other end of the body toward the said one end, terminating short of the said midpoint and axially beyond the termini of the long blades, and the individual blades each being formed with a convex leading surface and a concave trailing surface relative to the intended direction of rotation, each surface being curved in transverse cross section to a radius of curvature that remains constant along the axial extent of the blade, with the radius of curvature of the trailing surface being larger than that of the leading surface.

6. In a rotor for use in a mixer, such as a rubber mixer or the like, four blades arranged in two pairs with the blades of each pair disposed diametrically opposite each other about a longitudinal axis of the rotor, said blades being curved helically and each pair extending at least in part along different axial portions of the rotor from the other pair, said blades each being formed with a leading surface and a trailing surface relative to the direction of rotor rotation, which surfaces in planes of transverse cross section have a constant curvature along the axial length of the blades.

7. In a rotor for use in a mixer, such as a rubber mixer or the like, a bladed portion having a central axially elongated body, two long helical blades arranged as a pair diametrically opposite each other on the body and extending from one end thereof toward the other end, terminating beyond the midpoint of the body short of the said other end, two short helical blades arranged as a pair diametrically opposite each other on the body and extending from the said other end of the body toward the said one end, terminating short of the said midpoint but extending axially at least to the location where the long blades terminate, said blades each having a convex leading surface with a constant radius of curvature substantially equal to the mean diameter of the central body of the rotor, and having a curved concave trailing surface.

8. In a rotor for use in a mixer, such as a rubber mixer or the like, a bladed portion having a central axially elongated body, two long helical blades arranged as a pair diametrically opposite each other on the body and extending from one end thereof toward the other end, terminating beyond the midpoint of the body and short of the said other end, two short helical blades arranged as a pair diametrically opposite each other on the body and extending from the said other end of the body toward the said one end, terminating short of the said midpoint therebetween but extending axially at least to the location where the long blades terminate, said blades each having a convex leading surface with a constant radius of curvature substantially equal to the mean diameter of the central body of the rotor, and having a curved concave trailing surface with a constant radius of curvature substantially twice the radius of the leading surface.

9. In a rotor for use in a mixer, such as a rubber mixer or the like, four blades arranged in two pairs with the blades of each pair disposed diametrically opposite each other about a longitudinal axis of the rotor, said blades being curved helically and each pair extending at least in part along different axial portions of the rotor from the other pair, said blades each being formed with a leading surface and a trailing surface relative to the direction of rotor rotation, which surfaces in planes of transverse cross section have a constant curvature throughout the axial length of the blades, and the cross sectional area of said rotor diminishing inwardly from outer axial ends of the two pairs of blades.

10. In a rotor for use in a mixer, such as a rubber mixer or the like, a bladed portion having a central axially elongated body, long helical blade means on the body extending from one end thereof toward the other end, terminating beyond the midpoint of the body and short of the said other end; short helical blade means on the body and extending from the said other end of the bladed portion of the rotor toward the said one end, terminating short of the midpoint therebetween and axially beyond the termini of the long blade means, said long and short blade means being formed with convex leading surfaces and concave trailing surfaces relative to the intended direction of rotor rotation, each surface being curved in transverse cross section to a radius of curvature that remains constant along the axial extent of the blade means, with the radius of curvature of the trailing surfaces being larger than that of the leading surfaces; and said central body of the bladed portion being essentially circular in transverse cross section and diminishing in cross sectional area inwardly from both axial ends to reduce the total cross sectional area of the body and blade means in both inward directions from the axial ends of the bladed portion.

11. In a mixer for mixing rubber or the like, a pair of parallel rotors disposed in an enclosure, each rotor supported for rotation within the enclosure, means to rotate the rotors in counter rotation, two long helical blades arranged as a pair diametrically opposite each other on each rotor, two short helical blades arranged as a pair diametrically opposite each other on each rotor in part axially spaced from the long blades and in part overlapping and displaced peripherally 90 degrees from the long blades along the axial portion of the rotors where they overlap with the long blades, all of said blades having leading edge surfaces of constant curvature throughout their axial extent and diminishing in cross sectional area axially inwardly from outer ends.

References Cited
UNITED STATES PATENTS

| | | | |
|---|---|---|---|
| 2,309,594 | 1/1943 | Hutchings | 259—104 X |
| 2,820,618 | 1/1958 | Bolling | 259—104 |
| 3,348,816 | 10/1967 | Cox | 259—41 |

ROBERT W. JENKINS, *Primary Examiner.*